United States Patent [19]

Parsons

[11] Patent Number: 4,650,046
[45] Date of Patent: Mar. 17, 1987

[54] MOTOR VEHICLE TRANSMISSION INCLUDING A HILL HOLDER DEVICE

[75] Inventor: David Parsons, Kenilworth, England

[73] Assignee: Automotive Products plc, Leamington Spa, England

[21] Appl. No.: 690,505

[22] Filed: Jan. 10, 1985

[30] Foreign Application Priority Data

Jan. 11, 1984 [GB] United Kingdom ................ 8400698

[51] Int. Cl.⁴ ...................... B60K 41/24; F16D 67/04
[52] U.S. Cl. .................................. 192/3 H; 192/4 A
[58] Field of Search .............. 192/4 A, 4 R, 3 H, 3 S, 192/9, 4 B, 12 B; 188/71.4, 71.5

[56] References Cited

U.S. PATENT DOCUMENTS

| 1,965,709 | 7/1934 | Morse | 192/4 A |
| 3,917,040 | 11/1975 | Radcliffe | 192/4 A |
| 3,998,111 | 12/1976 | Blake | 192/4 A |
| 4,024,936 | 5/1977 | Crabb | 192/4 A |
| 4,128,145 | 12/1978 | Euler | 192/12 B |
| 4,358,001 | 11/1982 | Iverson | 188/71.5 |
| 4,515,259 | 5/1985 | Ha | 192/4 A |

FOREIGN PATENT DOCUMENTS

| 506514 | 4/1928 | Fed. Rep. of Germany . |
| 654484 | 10/1934 | Fed. Rep. of Germany . |
| 2232199 | 12/1974 | France . |
| 512514 | 9/1939 | United Kingdom . |
| 691798 | 5/1953 | United Kingdom . |
| 2086497 | 5/1982 | United Kingdom . |
| 2095774 | 10/1982 | United Kingdom . |
| 2101256 | 1/1983 | United Kingdom . |
| 2120418 | 11/1983 | United Kingdom . |

Primary Examiner—Rodney H. Bonck
Assistant Examiner—John Malcolm White
Attorney, Agent, or Firm—Solon B. Kemon

[57] ABSTRACT

The transmission includes a rotary shaft for transmitting drive to driving wheels of the vehicle, a fixed gearbox casing and a hill holder between the shaft and the gearbox casing. The hill holder, when operative, inhibits reverse movement of the vehicle and includes in series a sprag clutch and a multiplate brake. Fluid is supplied from a fluid operable control system for operating the brake and controls the rate of engagement of the brake.

11 Claims, 7 Drawing Figures

| S | A | B | C | D |
|---|---|---|---|---|
| 1-2 | 0 | 1 | 0 | 1 |
| 2 | 0 | 0 | 0 | 1 |
| 2-3 | 0 | 0 | 1 | 1 |
| 3 | 0 | 0 | 1 | 0 |
| 3-4 | 0 | 1 | 1 | 0 |
| 4 | 0 | 1 | 0 | 0 |
| 4-5 | 1 | 1 | 0 | 0 |
| 5 | 1 | 0 | 0 | 0 |
| 5-1 | 1 | 0 | 1 | 0 |
| R-1 | 0 | 0 | 0 | 0 |

| S | | 143 | 144 | 145 | 146 |
|---|---|---|---|---|---|
| N | | 0 | 0 | 0 | 0 |
| 1 | 2 | 0 | 1 | 1 | 1 |
| 2 | | 0 | 1 | 0 | 0 |
| 2 | 3 | 0 | 1 | 1 | 0 |
| 3 | | 0 | 0 | 1 | 0 |
| 3 | 4 | 1 | 1 | 1 | 0 |
| 4 | | 1 | 1 | 0 | 0 |
| 4 | 5 | 1 | 1 | 0 | 1 |
| 5 | | 0 | 0 | 0 | 1 |
| 5 | 6 | 1 | 0 | 0 | 1 |
| 6 | | 1 | 0 | 0 | 0 |
| 1 | R | 1 | 0 | 1 | 1 |
| 3 | R | 1 | 0 | 1 | 0 |

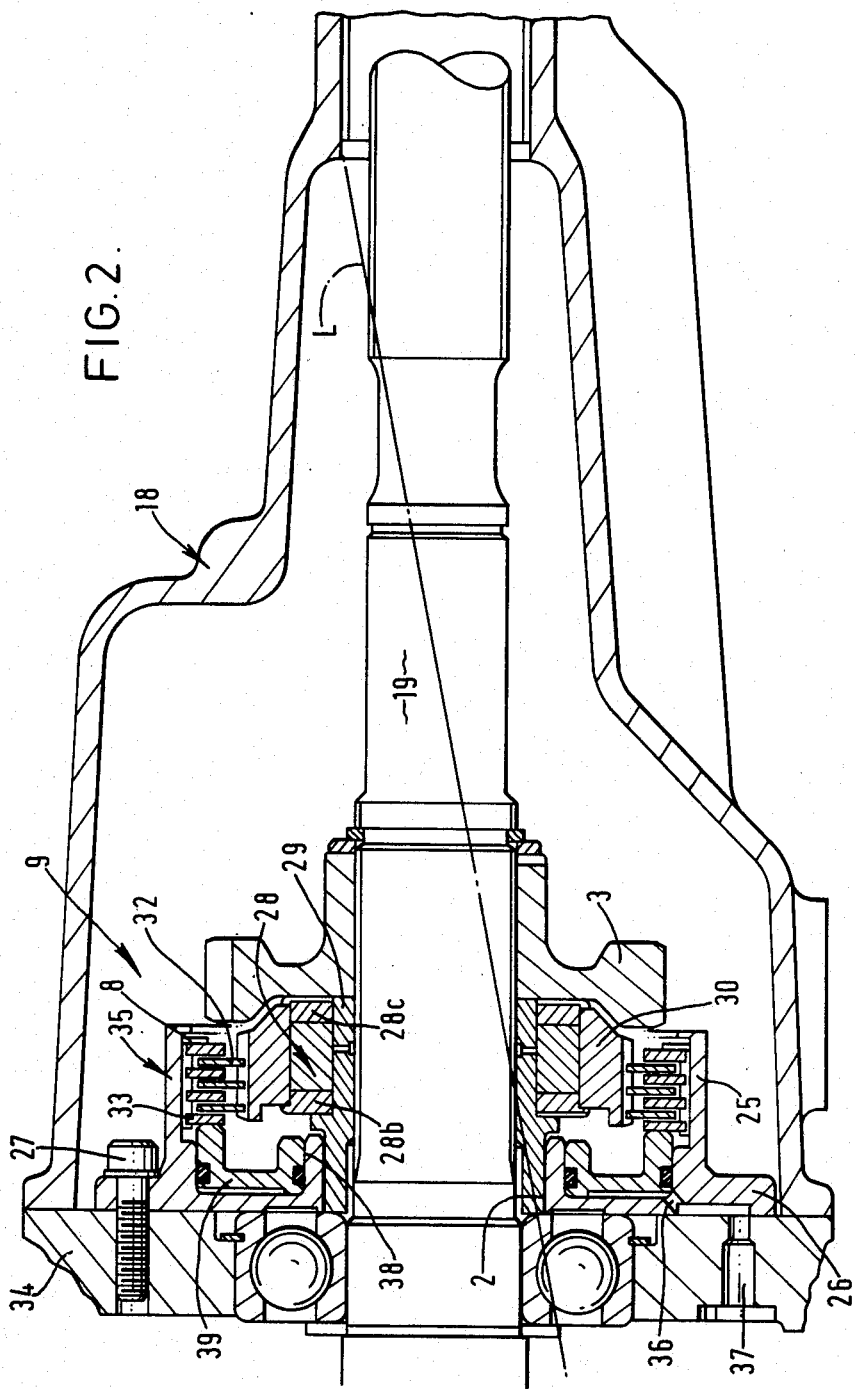

MOTOR VEHICLE TRANSMISSION INCLUDING A HILL HOLDER DEVICE

The invention relates to a motor vehicle transmission which includes a hill holder device.

It has previously been proposed in GB No. 512514 to provide a hill holder device as part of a manual tranmission in a vehicle. In No. 512514 the transmission includes a rotary part for transmitting drive to driving wheels of the vehicle, a fixed part and a hill holder arranged between the fixed and rotary parts for inhibiting unwanted reverse movement of the vehicle on inclines. One of the hill holders described includes in series a unidirectional clutch and a multiplate clutch unit having a fixed torque capacity. The purpose of the multi-plate clutch unit is to prevent undue shocks or stress occurring in the transmission should the hill holder be engaged by selecting first gear once the vehicle has begun to move backwards. In such a case the rotary plates of the clutch are intended to slip relative to the fixed plates. A problem with this hill holder is that the multiplate clutch must have sufficient torque capacity to hold the vehicle on steep gradients whilst at the same time allow slippage as described above. As the torque capacity must be substantial in order to hold the vehicle on a steep incline, the transmission components are still subject to considerable stress if the hill holder is engaged during roll-back of the vehicle as considerable torque, known as the 'breakout torque', is necessary to overcome the resistance to initial relative movement between the fixed and rotary plates.

An object of the present invention is to provide a transmission having an improved hill holder which overcomes to a considerable extent the disadvantages of the above prior proposals.

According to the invention there is provided a motor vehicle transmission including a rotary part for transmitting drive to at least one driving wheel of the vehicle, a fixed part and a hill holder device arranged between the fixed part and rotary part for inhibiting reverse movement of the vehicle, the hill holder device comprising in series unidirectional means and a coupling characterised in that the coupling is disengageable and control means is provided which enables the coupling to be engaged in a controlled manner.

Controlled engagement causes the coupling initially to offer minimal resistance to rotation of the rotary part relative to the fixed part if the hill holder is engaged during reverse motion of the vehicle whereby stress in the transmission is reduced. Preferably the control means effects a rising rate of engagement of the coupling. In that manner, the resistance to rotation of the rotary part finally becomes sufficient to act as a reverse brake to resist rearward movement of the vehicle when it stands on a gradient.

However, if the vehicle is subjected to frontal impact with the hill holder engaged, the coupling will preferably permit the rotary part to slip relative to the fixed part thereby helping to prevent damage to the transmission or to the hill holder itself. Preferably the coupling is fluid operable and the control means may be a fluid operable control system. Preferably the fluid operable control system is arranged to operate ratio-selector actuators of a change speed gearing. In such a case, the control system preferably supplies fluid to said fluid operable coupling simultaneously with the supply of fluid to one or more of said actuators, e.g. one which will be actuated when the starting gear ratio or a higher gear ratio for the vehicle is selected.

In order to facilitate slippage and smooth engagement of the coupling, the coupling may be in the form of a multiplate brake. The brake may include a piston for applying an engagement load to the plates, said piston being actuated by said control means.

Preferably the rotary part is a drive output shaft of the transmission. A member of said unidirectional means may be rotatably fast with the output shaft.

A member of said unidirectional means may be rotatably fast with a member of said disengageable coupling.

Preferably, the member of the unidirectional means is rotatably fast with a member of said disengageable coupling.

The plates of the multiplate brake may be immersed in lubricant. Such an arrangement helps to minimise initial resistance to slip between the plates of the multiplate brake.

A transmission in accordance with the invention will now be described by way of example with reference to the accompanying drawings in which:

FIG. 2 is a cross-section through part of the motor vehicle transmission shown in FIG. 1 showing a hill holder device;

Figures 1, 4, 6:
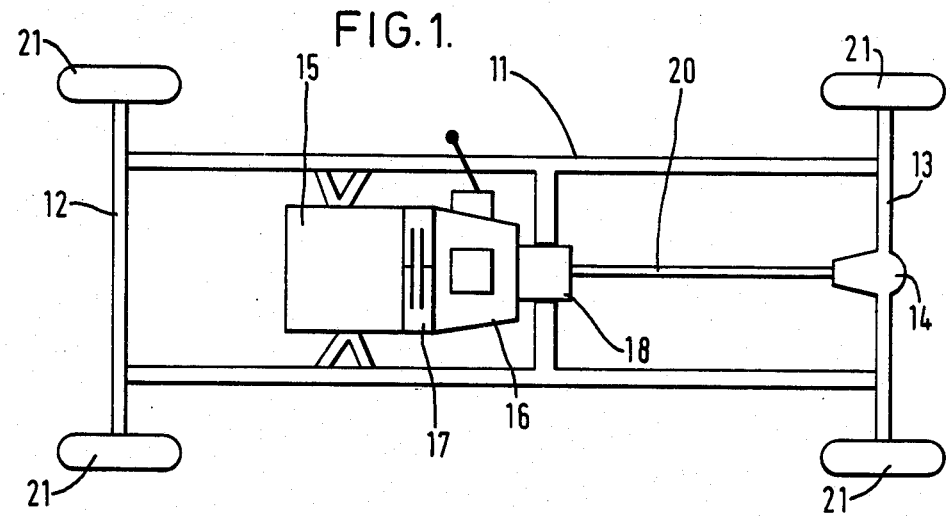
FIG. 1 is a plan view of a motor vehicle rolling chassis including a transmission according to the invention.
FIG. 4 is a logic table for the transmission control system shown in FIG. 3.
FIG. 6 is a logic table for the transmission control system shown in FIG. 5.

With reference to FIGS. 1 and 2 there is shown a motor vehicle rolling chassis including a chassis frame 11 joining a front axle 12 to a rear axle 13. Both the front and the rear axles 12, 13 have a wheel 21 at each end. An engine 15 is supported by the chassis frame 11 and is connected to a clutch housing 17 which connects the engine 15 to a gearbox 16, also mounted upon the chassis frame 11 by its casing 34. The gearbox 16 has a tailshaft casing 18 supporting a tailshaft 19, the tailshaft 19 connecting the engine 15 to at least one driving wheel of the vehicle through a propshaft 20 and final drive unit 14.

A hill holder device 9 (FIG. 2) is connected between the tailshaft 19 and the tailshaft casing 18 and includes a unidirectional clutch e.g. a sprag clutch 28 in series with a disengageable coupling in the form of a multi-plate friction brake 35. The friction brake 35 includes plates 33 having splined outer edges which locate on a splined interior of a cylindrical brake housing 25. The splined interconnection prevents rotation of the plates 33 relative to the housing 25 but permits relative axial movement. The brake housing 25 is fixed to the gearbox casing 34 by means of a flange 26 and bolts 27. The friction brake 35 also includes splined plates 32 interleaved with plates 33 and which locate on a splined outer race 30 of the sprag clutch 28. The inner race 29 of the sprag clutch 28 is also splined and drivably engages splines on the tailshaft 19. The inner race 29 extends into a coaxial bore 2 in the housing 35 and has its right hand end as viewed in FIG. 2 abutting a gear wheel 3 splined to shaft 19. Sprag members 28a are arranged between the inner and outer races 29, 32 and annular retaining plates 28b, 28c are arranged one each end of the sprag members.

The brake housing 25 is formed with an annular cylinder 38 which slidably houses an annular piston 39. Hydraulic fluid can be fed to the cylinder 38 from a controlled hydraulic supply 7 (FIG. 3) through a passage 36 in the brake housing 25 and an aligned port 37 in the gearbox casing 34. A duct 55 (FIG. 3) connects the port 37 to the hydraulic fluid supply 7. Admission of hydraulic fluid under pressure to cylinder 38 causes the piston 39 to move to the right as viewed in FIG. 1 so as to engage the brake by compressing the plates 32, 33 between itself and snap-rings 8 on the brake housing 25. At maximum fluid pressure the piston 39 exerts sufficient force to the plates 32, 33 to prevent reverse rotation of the tailshaft, and thereby prevent roll back of the vehicle on gradients. However if the vehicle is subjected to a suddenly applied load such as frontal impact by another vehicle when the brake is engaged under full pressure, the plates 32 will be permitted to slip relative to plates 33 to reduce generation of shock in the transmission and to prevent damage to the hill holder. By suitably selecting the area of the piston 39 and the material of plates 32, 33, the torque at which the plates 32 will slip relative to plates 33 at a given fluid pressure can be determined. The brake housing receives lubricant from the gearbox, the lubricant level being shown at L by a broken line (the gearbox and brake housing, in use, being inclined to the horizontal when the vehicle stands in a horizontal surface). The plates 32, 33 are, therefore, immersed in the lubricant.

Figure 3:
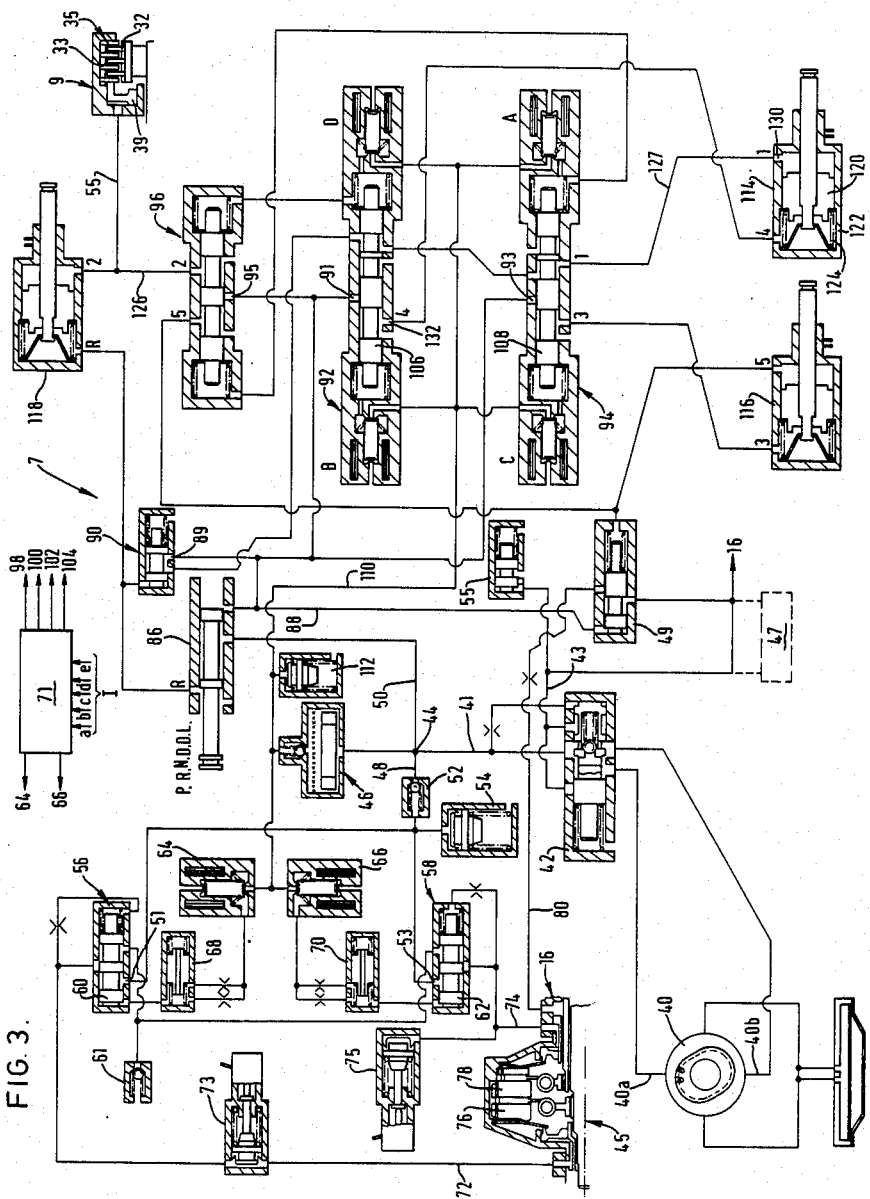
FIG. 3 is a line diagram of a transmission control system including a controlled hydraulic supply for the hill holder device shown in FIG. 2.

The gearbox 16 is a five speed and reverse twin-clutch kind, e.g. as shown in GB No. 2086497A. An hydraulic control system for such a gearbox is shown in FIG. 3 and is described below.

A main pump 40 having outlets 40a, 40b from first and second rotors (not shown) feeds hydraulic fluid to a regulator valve 42 of a kind similar to that shown in GB No. 2120418A which either causes fluid from both pump rotors to flow to a duct 41 when load in the control system is low or causes fluid from only one pump rotor to flow to duct 41 when the load is high. In the latter case, fluid from the other rotor passes through duct 43 to gearing 16 for lubrication and to a twin clutch arrangement 45 via a cooler 47 (which is optional) a clutch coolant valve 49 and a duct 80. A pressure control valve 55 is connected to duct 43 to control pressure of the coolant fluid. At a junction 44, flow from the valve 42 passes partly to a magnetic filter and strainer 46 and partly through ducts 48, 50. Duct 48 directs fluid via a non-return valve 52 to an accumulator 54 to stabilise supply pressure and to inlets 51, 53 of a pair of modulated selector valves 56, 58. The modulated selector valves 56, 58 includes respective spools 60, 62 which shuttle between inlet supply and drain via a non-return valve 61 under the control of respective solenoid valves 64, 66 and feed back pressure in ducts 72, 74 connecting valves 56, 58 to respective fluid operable clutches 76, 78 of gearbox 16. The modulated selector valves may be of the type described in GB No. 2101256A. The solenoid valves 64, 66 receive filtered hydraulic fluid from magnetic filter and strainer 46 and direct it under controlled pressure to the modulated selector valves 56, 58 via temperature sensitive control valves 68, 70. The valves 64, 66 produce square wave signals each having a mark to space ratio controlled by an electronic control unit 71. Engagement of the relevant clutch 76 or 78 is controlled by the electronic control unit 71 which provides signals at appropriate times to energise the solenoid of the required valve 64 or 66. Pressure sensors 73, 75 provide the electronic control unit 71 with signals which indicate a state of engagement or disengagement of the clutches.

Duct 50 directs hydraulic fluid to the usual selector valve 86 from which it passes partly along line 88 to control the clutch coolant valve and partly to inlets 91, 93 and 95 respectively of a reverse shuttle valve 90, spool valves 92, 94 and an auxiliary valve 96. The spool valve 92 is operated by two solenoids B, D and the spool valve 94 is operated by two solenoids A, B. The solenoids A, B, C, D are energised at appropriate times by the electronic control unit 71 and reference can be made to GB No. 2086497A for operation details of systems of this general type. The left and right hand ends of the spools 106, 108 of the respective valves 92, 94 are subject to pressure from filtered hydraulic fluid on operation of the assembled solenoids from a duct 110 leading from the filter 46. The duct 110 is also associated with an accumulator 112 to stabilise the filtered fluid supply pressure. The valves 90, 92, 94 and 96 control the operation of actuators 114, 116 and 118 for selecting the gear ratios in gearbox 16.

Each of the actuators comprises a piston and a cylinder 120, 122 and a return spring 124. Fluid inlet/outlet ports are provided at each end of the cylinder. The ports of the actuators are marked 1, 2, 3, 4, 5 and R and are connected to similarly numbered ports of the spool valves 92, 94 and auxiliary valve 96. The numbers 1–5 and R represent those ports through which fluid flows to engage associated synchros for selecting ratios 1–5 and reverse. Pressure applied to port 5 of actuator 116 is also applied to the clutch coolant valve 49 to shut off flow through the valve where ratio 5 is selected. FIG. 4 is a logic table which shows the synchros S engaged upon operation of solenoids A, B, C, D. When solenoids B and D are energised ports 1 and 2 are put under pressure simultaneously so that synchro 1 selects ratio 1 and synchro 2 preselects ratio 2. Drive is effected through one of the clutches 76, 78 in ratio 1 and to change to ratio 2 the first clutch is released and the other engaged. Solenoid B is then disengaged leaving port 2 under pressure and synchro 2 selected. Solenoid C is engaged to pressurise port 3 and preselect ratio 3. Ratio 3 is then engaged by changing over clutches again. This procedure is repeated in accordance with the logic table. It will be apparent that the hill holder will be engaged when port 2 is under pressure, the latter being under pressure when ratio 1 is selected. The hill holder will not be engaged in ratios 3–5 and R.

The hill holder device 9 has its fluid input duct 55 connected to a duct 126 which is pressurised simultaneously with a duct 127 to pressurise ports 1 and 2 as described above. Therefore the piston 39 of the hill holder will actuate the multiplate brake 35 when driving away in ratio 1 or ratio 2.

Figure 7:
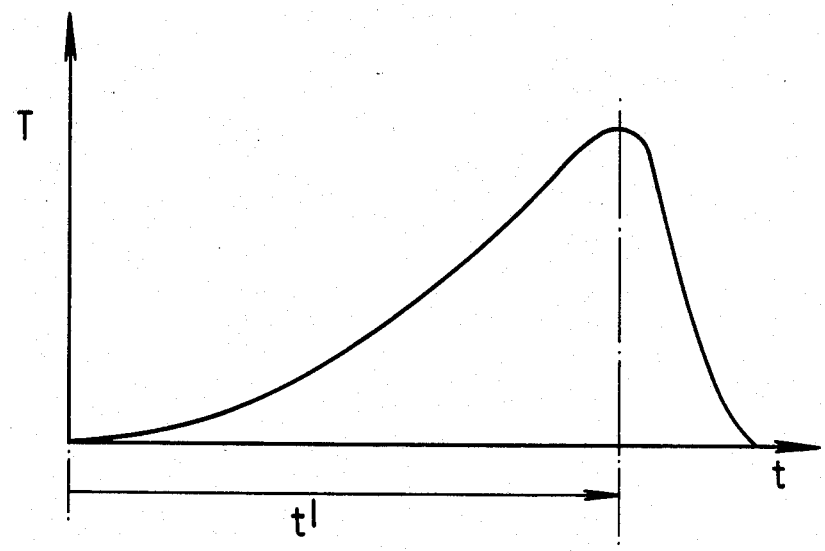
FIG. 7 is a graph of torque in the vehicle tailshaft v time.

Coming now to the electronic control unit 71, inputs are provided for the unit which are derived from (a) engine speed, (b) vehicle speed, (c) throttle position, (d) gear selector (when used to select a given ratio manually) and (e) signals indicating that given actuators and clutches are engaged. The inputs are processed electronically to provide output signals to effect operation of the clutches 76, 78 and actuators 114, 116 and 118. When a given ratio is selected, and pressure applied to the actuator, the piston 120 moves axially against its return spring and prevents an instantaneous build up of pressure to a maximum in the duct leading to the actuator. Therefore when pressure is applied to the actuator 118 movement of the piston 120 therein axially will effectively slow down pressure build up in ducts 126 and 55, therefore, full pressure will not be applied to piston 39 of the hill holder 9 until the piston 120 reaches its limit of axial movement whereupon pressure will build up rapidly to a maximum. Pressure on piston 39 will similarly increase until full engagement of the brake plates 32, 33 is achieved. If desired a restrictor could be incorporated in duct 55 to ensure that the time taken by the actuator would not be unduly reduced by the pressure of the hill holder cylinder 38. Such controlled build up of pressure effective in duct 55 prevents the piston 39 of the hill holder exerting what could otherwise be a virtually instantaneous movement from a "brake off" to a "brake fully on" condition. If the vehicle is being reversed rapidly and the gear selector 86 is moved to forward drive, the controlled build up of fluid pressure in the hill holder will initially offer minimal resistance to slip between the plates 32, 33 while the vehicle is still moving backwards, but will build up to a level sufficient to inhibit reverse movement of the vehicle on a gradient. Therefore transmission shock is substantially reduced whilst still enabling the hill holder to provide effective reverse braking. FIG. 7 illustrates a graph of torque (T) in the tailshaft 19 against time (t) during a gear shift to forward drive when the vehicle is rolling backwards. As soon as forward drive is selected pressure in actuator 118 begins to increase and the pressure is simultaneously applied to the piston 39 of the hill holder. The pressure on the piston 39 effects engagement of the brake plates 32, 33. As the piston 120 of the actuator encounters the bias of its associated return spring 124 the pressure builds up thereby gradually increasing the braking torque in the shaft 19. Over a period of time $t^1$ (eg around 2.9 seconds) the pressure builds up to a maximum and full braking torque finally brings the vehicle to rest whereupon torque in the tailshaft 19 falls to zero. Unlike the system described in GB No: 512514 the shaft 19 does not have to transmit any substantial breakout torque in view of the initial low frictional resistance between plates 32, 33. The lubricant in the brake housing 25 also helps to minimise initial resistance to slip between plates 32, 33.

Figure 5:
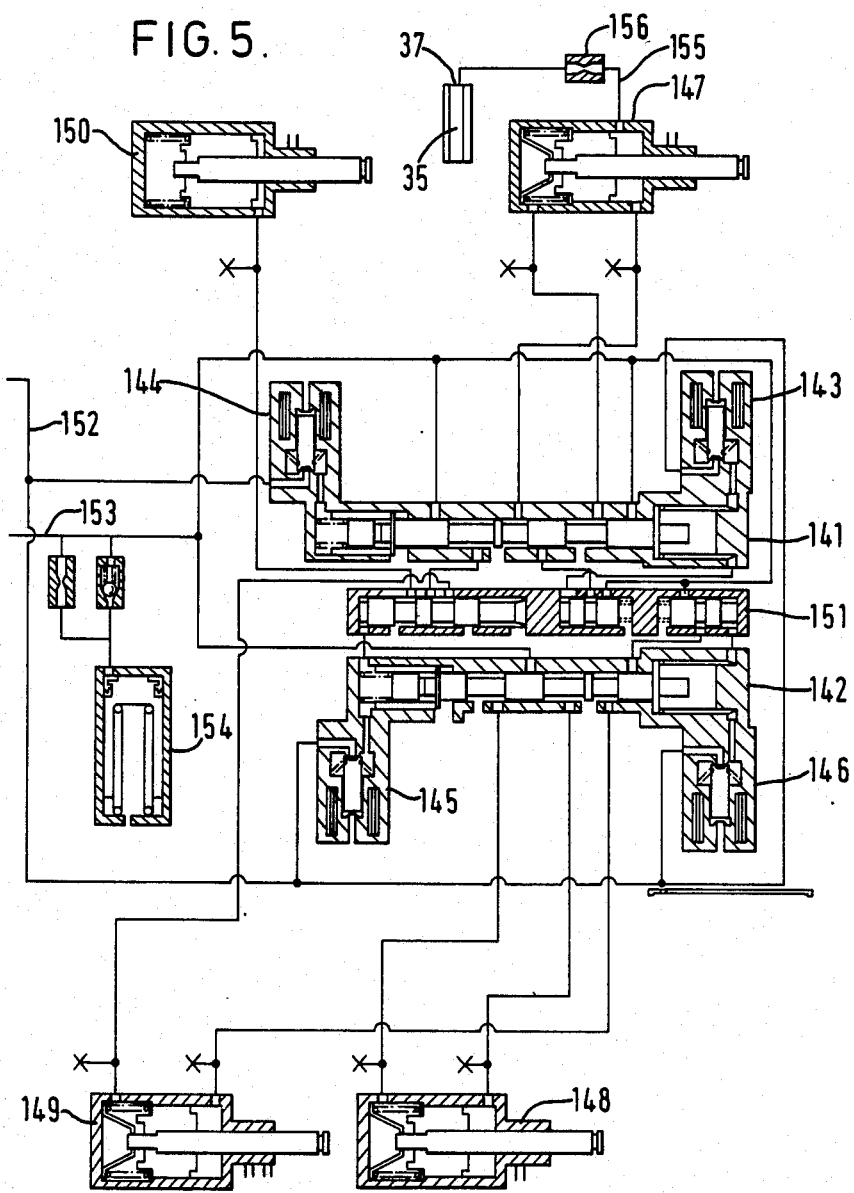
FIG. 5 is a line diagram showing part of an alternative tranmission control system.

Reference is now made to FIGS. 5 and 6 which illustrate part of another control system for a transmission in accordance with the invention.

In FIG. 5 the control is for a gearbox of the kind described in GB. No: 2095774A, being a six (forward) speed type having five gear wheel pairs. The actuator control system shown in FIG. 3 is generally as described in GB 2086497A adapted to control six forward speed ratios. It comprises two spool valves 141 and 142 each having a spool movable into a number of predetermined positions depending on the energisation of solenoid valves 143, 144 and 154, 146. The spool valves 141 and 142 are connected directly to the gear selection actuators 147 and 148 for 2nd and 4th and 3rd and 5th gear ratios and indirectly through a multiple relay valve 151 of the 1st and 6th and reverse gear ratio selection actuators 149 and 150.

A filtered oil supply to the solenoid valves 143, 144, 145 and 146 is obtained through a passage 152. A second passage 153 connected to a constant pressure hydraulic source of the kind described with respect to FIG. 3 is supplied to the spool valves 141, 142 and to the multiple relay valve 151. An accumulator 154 is included between the hydraulic source and the spool and relay valves to stabilise the supply pressure.

A passage 155 hydraulically connects the 2nd gear actuator 147 through a restrictor 156 to the port 37 formed in the gearbox casing 34.

The operation of the actuator control system is generally as described in GB 2086497A as will be apparent by reference to that specification and the logic table of FIG. 6. The hill holder device will only be engaged when hydraulic pressure is supplied to the second gear actuator 147.

As in FIG. 3 selection of the starting gear ratio i.e. first gear, also causes the pre-selection of the second gear train. Hence the hill holder device is also operated preventing rearward motion of the vehicle. If reverse is selected, the second gear train is not pre-selected so that the hill holder device is not engaged. As in FIG. 3 the build up of pressure when operating the actuator 147 causes the brake 35 initially to offer minimal resistance to slip. By permitting such slip to occur, transmission shock and damage to the hill holder are reduced if the hill holder is engaged while the vehicle is rolling backwards. As the pressure increases the effectiveness of the brake also increases until at full pressure the braking force will be sufficient to hold the vehicle on a gradient. As stated above, the braking characteristics of the brake 35 are selected by appropriate choice of plate materials and piston size so that at full system pressure, slippage can occur between the plates 32, 33 if the vehicle is subject to a suddenly applied load, such as frontal impact with another vehicle when first or second gear is selected and the hill holder engaged.

Although the hill holder device has been described as incorporated in a transmission of the twin clutch type it may be incorporated in other kinds of motor vehicle transmission where the rate of hill holder engagement can be controlled.

As the full holder has at the most only to hold the vehicle on a hill to inhibit roll back and does not have to resist full engine torque, the plates 32, 33 can be made relatively small enabling the hill holder to be of compact construction.

I claim:

1. A motor vehicle transmission including a rotary part for transmitting drive to at least one wheel of the vehicle, a fixed part, a hill holder device coupled to the fixed part and rotary part for inhibiting reverse movement of the vehicle, the hill holder device comprising in series unidirectional means and a fluid-operable control system for operating ratio selector actuators of a change-speed gearing and which is arranged to apply an increasing fluid pressure to the disengageable coupling to effect a rising rate of coupling engagement, the fluid operable control including a resiliently biassed member of one of said actuators which moves against its bias in response to pressure applied to the disengageable coupling whereby the rate of increase in fluid pressure is dependent on the movement of said member against its bias, the fluid operable coupling and an actuator for selecting a higher gear ratio than a starting gear ratio for the vehicle being fed with fluid simultaneously.

2. A transmission according to claim 1 in which the fluid operable disengageable coupling is a multiplate brake.

3. A transmission according to claim 2 in which the rotary part comprises a tailshaft of the transmission.

4. A transmission according to claim 3 in which a member of said unidirectional means is rotatably fast with the tailshaft.

5. A transmission according to claim 2 in which the plates of said multiplate brake are immersed in lubricant.

6. A transmission according to claim 2 in which said multiplate brake includes a piston for applying an engagement load to the plates, said piston being actuated by said control means.

7. A transmission according to claim 1 in which said member is an axially movable piston of said one actuator which transmits movement in an output member to select a ratio of the change speed gearing.

8. A transmission according to claim 7 in which the rising pressure for operating the disengageable coupling reaches a maximum when the piston reaches a limit of axial movement against its bias.

9. A transmission according to claim 1 in which a member of said unidirectional means is rotatably fast with a member of said disengageable coupling.

10. A transmission according to claim 1 in which a member of said unidirectional means is rotatably fast with the tailshaft and comprises an inner race of a unidirectional clutch and the member of said unidirectional means fast with a member of a disengageable coupling is an outer race of the unidirectional clutch.

11. A transmission according to claim 1 in which the rising pressure for operating the disengageable coupling reaches a maximum when said member reaches a limit of movement.

* * * * *